Jan. 3, 1939. L. LANGHAAR 2,142,474
ANTIFRICTION BEARING
Filed May 8, 1933
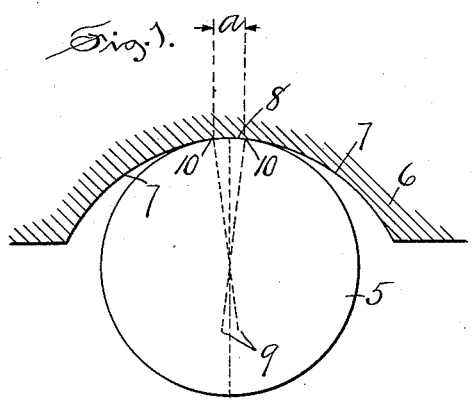
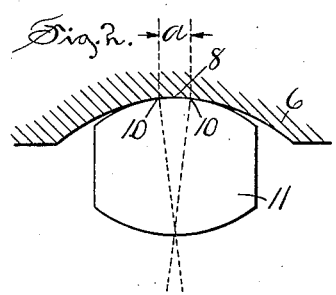
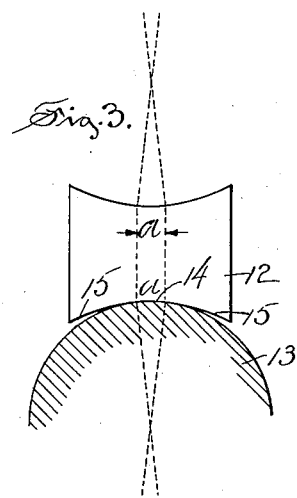
INVENTOR
Louis Langhaar,
by
Arthur Jenkins,
ATTORNEY Patented Jan. 3, 1939

2,142,474

UNITED STATES PATENT OFFICE 2,142,474

ANTIFRICTION BEARING

Louis Langhaar, Allentown, Pa., assignor, by mesne assignments, to United Motors Service, Inc., Detroit, Mich., a corporation of Delaware Application May 8, 1933, Serial No. 669,837

2 Claims. (Cl. 308—214)

My improvement relates to that type of bearings in which friction is reduced by the use of rolling members, and an object of my invention, among others, is the production of a bearing wherein maximum results may be obtained both as to the reduction of wear by friction and also in support for the rolling members under loaded conditions.

One form of my improved bearing in the construction and use of which the objects herein set out, as well as others, may be attained, is illustrated in the accompanying drawing, in which—

Figure 1 is a view in section through a portion of a ball race with a ball therein and illustrating diagrammatically my invention under conditions of use.

Figure 2 is a similar view illustrating my invention as applied to a roller member of convex shape.

Figure 3 is another similar view illustrating my invention as applied to a roller bearing of concave shape.

The general laws relating to conditions of use in anti-friction bearings embodying rolling members are understood by those skilled in the art and for the purpose of clearly describing my invention herein a brief statement concerning such laws is made.

The load capacity of a ball bearing increases as the radius of the cross-sectional curvature of the ball race approaches the ball radius and, conversely, the load capacity of such bearing decreases as the cross-sectional race radius increases in proportion to the ball radius. A cross-sectional race radius substantially 65% of the ball diameter is considered good practice. To approach the ball radius closer increases friction, while a greater cross-sectional radius of the race member decreases capacity, and herein lies a nice and delicate relationship whereon durability largely depends.

It is common practice to use a race member having a cross-sectional curvature comprising an arc of a circle, but this has its limitations, as hereinbefore explained, as, if the diameter of such circle approaches too closely the diameter of the ball, friction is increased, and if the diameter of such circle departs too much from the ball diameter load capacity decreases.

Rollers, as distinguished from balls, may be formed to embody my invention, such rollers being convex or concave, and the conditions existing at the contact area between the rollers and the race will be similar to those existing at such places between the ball and the race and, therefore, the advantages herein described and claimed for the ball type apply also to the roller type of anti-friction bearings.

I, therefore, assume, for purpose of explanation only and not for rigid adherence thereto, that a race member having a cross-sectional curvature with a radius substantially 65% of the diameter of the roller member will give a contact width having a reasonably low friction resistance. From the above explanation it is clear that if the cross-sectional curvature of the race and that of the anti-friction member are susbtantially equal at only the contact area, a tremendous advantage in durability will be obtained and particularly if this contact area is limited to a width substantially corresponding to that obtained by a 65% curvature hereinbefore referred to. In such event the friction would be substantially that of a 65% curvature while the specific load over the whole contact area would be materially reduced by better distribution. The fatigue limits, and hence the useful life of the material, would be greatly increased.

It is the purpose of my present invention to effect these results, but it will be understood that the actual radii stated are illustrative only and not limiting. In accomplishing this purpose I use a variable radius cross-sectional curve for the raceways for ball bearings, and for rollers the result is similarly attainable by proper curvature of the race or roller or both.

My invention consists in using a close curvature between the race and the anti-friction member at the contact region and which curvature is tangent to a flatter curvature each side thereof. The specific curve or curves employed is of no import, provided this result is attained. For convenience in fabrication I prefer three tangent arcs, but I do not by any means limit myself to such.

In explanation of the drawings, it is common practice where the race curvature closely approaches that of the anti-friction member to show no difference between the race and such member because of visual limitations. Therefore, because no visual difference is shown for the width marked a in the figures of the drawing, it does not follow that no difference exists, but that this is an area of close race curvature the same or greater than the curvature of the cooperating member. This width marked a is not actual or proportional, but merely illustrative for visual convenience.

Referring to Figure 1 the numeral 5 denotes a ball and 6 a race member, the lines a denoting the width of the close curvature between the race member and ball. The numeral 7 denotes portions of the raceway on opposite sides of the contact area which are curves forming part of the race member but which are tangent to the curve 8 comprising the contact area. As illustrated herein the tangent curves 7 are struck from centers denoted by the numeral 9, and are tangent to the curve 8 at the points 10. It will be understood, however, that the curves 7 are not of necessity circular arcs, because variable curves may be employed with radii of any number or size provided that at the tangent points 10 those curves are of greater radius than that of the contact curve 8, the invention residing in that feature wherein the contact curve 8 between the race and the anti-friction member is a width of close curvature and tangent to flatter curves on opposite sides thereof.

As shown in Fig. 2 of the drawing a barrel shaped roller 11 is supported in the raceway 6, the curvature of the raceway and the roller, however, comparing the same as with respect to Fig. 1 and the conditions being the same as in said Fig. 1. In Fig. 3 a concave roller 12 is shown in connection with a race member 13 which is of circular form. However, the relationship between the curves of the roller 12 and the race member 13 are the same as hereinabove described with respect to Fig. 1, the curvature of the contact 14 between the ball and the race terminating at tangent curves 15. Otherwise the statements hereinbefore made as to the structure of Fig. 1 apply to the structures of Figs. 2 and 3 and the rollers and races of the latter figures may be of variable curvatures so long as they have a close curvature for a desired width with flatter curves tangent thereto in either or both members. This will apply to any anti-friction bearing in which the race or anti-friction member or both is or are of curved cross-sectional contour.

The actual width of contact between the race and the roller member, other things being equal, varies with the load and I do not herein limit or define the width of the contact curve 8, as that is a detail of specific design and not a generic function. Because of this variable width which may be created for the said contact area the words in the claims "at the place of contact" refer only to that region, whose transverse cross-sectional extent may also be termed the width (or arc) of economical contact.

From what has heretofore been said it may be seen that the actual maximum separation between the bearing elements at any point in the distance between the points 10—10 may be so slight that under load all points between said points 10 merge into one contact area and would therefore serve the same general functions as hereinbefore explained, and therefore that any structure in which a single contact area underload will result through a variable or multiple curvature will be considered as within the spirit and scope of my invention, my main purpose being to increase the area of a single contact race by a plurality of curves for the race or anti-friction member or both but limited to a single contact area under load.

I claim:

1. In a device of the character indicated, cooperating bearing-elements curved in transverse cross-section and initially of the same transverse contour for substantially the arc of contact under normal load, the contour of one of said elements beyond said arc and upon each side thereof being a curve that is curved about the cooperating bearing member and is tangent to said arc at substantially said arc's extremities; substantially as described.

2. In a device of the character indicated, a ball, and its cooperating race-member whose transverse cross-sectional contour is initially curved upon the ball radius for substantially the arc of contact under normal load, and beyond said arc is curved about the ball upon a greater radius, such other curved portion being tangent to substantially said arc's extremity; substantially as described.

LOUIS LANGHAAR.